Sept. 4, 1945.  T. A. FINN  2,384,162
FOLDING FISH NET
Filed April 8, 1944
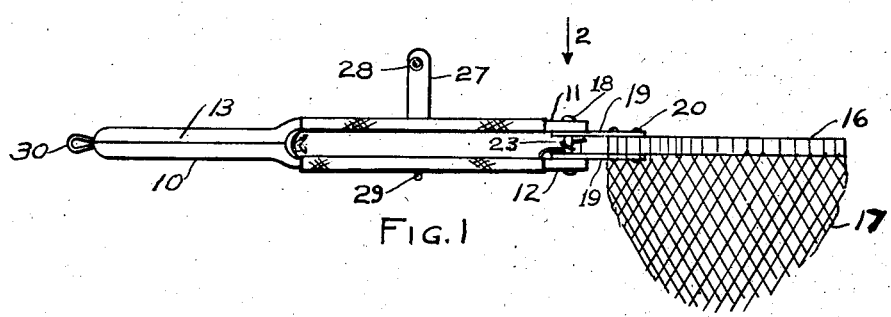
FIG. 1
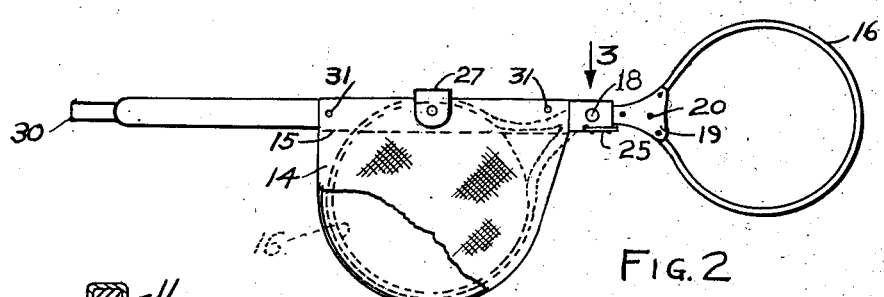
FIG. 2
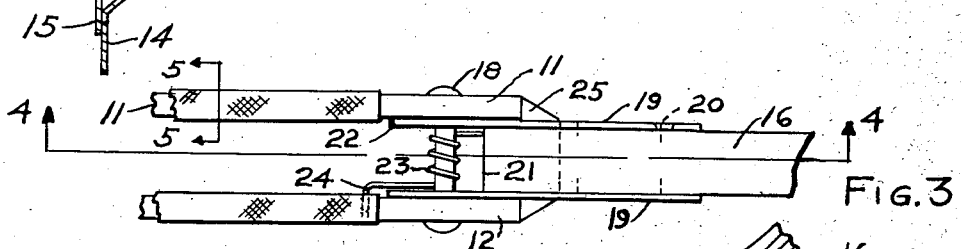
FIG. 5
FIG. 3
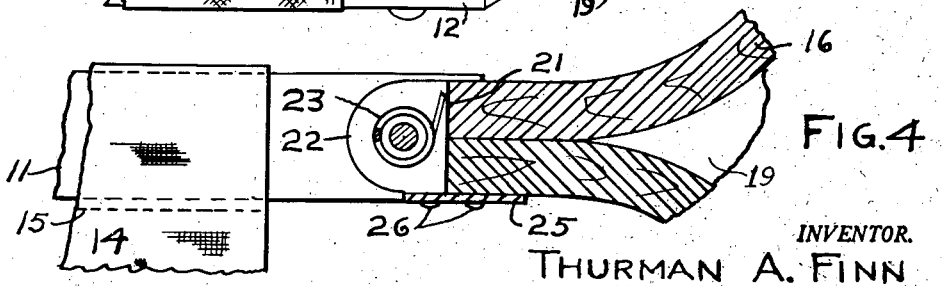
FIG. 4
INVENTOR.
THURMAN A. FINN
BY
Martin E. Anderson
Attorney Patented Sept. 4, 1945

2,384,162

UNITED STATES PATENT OFFICE 2,384,162

FOLDING FISH NET

Thurman A. Finn, Denver, Colo.

Application April 8, 1944, Serial No. 530,202

3 Claims. (Cl. 43—12)

This invention relates to landing nets of the type employed by fishermen.

It is the object of this invention to produce a landing net that can be collapsed into a small space for packing and for transportation and which can be quickly opened by the use of one hand in landing a fish caught on a hook by the aid of a line and rod and while operating the rod by the other hand.

It is well known that many of the best fishing places are along streams and lakes where the shore is wooded and where there are many small shrubs, trees and brushes. With the ordinary net carried by a belt in the usual manner, the reticulated net catches on branches and twigs and causes considerable delay and trouble.

It is the object of this invention, as above stated, to produce a net of a simple construction that can be folded into a compact space and in which the net portion is entirely surrounded by walls of canvas or other suitable material so as to prevent its coming into contact with brush and twigs.

Another object is to produce a foldable fish net in which the net portion is secured to a frame that does not change its shape during the folding and unfolding operations and in which the net and the frame to which it is directly connected will be of standard size and shape.

I am aware that landing nets have been invented that can be folded and others that are of such construction that the net frame can be collapsed and telescoped into a tubular handle. Such nets, although they are compact, are however, open to several objections, among the greatest of which is that the net portion itself is nearly always exposed and in position to get caught in twigs and bushes.

In order to explain this invention so that it may be readily understood by others skilled in this art, reference will be had to the accompanying drawing in which the invention has been illustrated in its preferred form, and in which:

Figure 1 is a side elevation of the net showing it in operative position;

Figure 2 is a top plan view looking in the direction of arrow 2, Figure 1, and shows, by full lines, the net in extended position and by dotted lines in folded position;

Figure 3 is a fragmentary top view looking in the direction of arrow 3, in Figure 2, and shows the hinge by means of which the net frame is secured to the handle;

Figure 4 is a section taken on line 4—4, Figure 3; and

Figure 5 is a section taken on line 5—5, Figure 3.

In the drawing reference numeral 10 designates a handle which, in the embodiment illustrated, has been shown as having the shape of an enlarged tuning fork having prongs 11 and 12. The actual manner of constructing the handle is immaterial, but in the present instance and for the purpose of simplifying the manufacture, the handle has been made in two parts which are identical in size and shape and which are secured by means of glue or other adhesive along the dotted line 13, shown in Figure 1. In the present embodiment, the handle is presumed to be made from wood, but it may, of course, be constructed from metal, if this should be found advantageous or desirable.

Secured to the prongs 11 and 12, is a pocket or bag which has been designated by reference numeral 14. This pocket has its edges along the open end thereof, provided with wide hems into which the prongs are inserted in the manner shown in Figure 5. The hems are secured by means of seams 15. When the pocket is in position, it is held open by the prongs so as to permit the net frame and net to enter in a manner which will hereinafter appear.

Reference numeral 16 designates a net frame which can be of the usual size and construction that is in common use. The net has been designated by reference numeral 17. Extending through the free ends of prongs 11 and 12 of the handle is a pivot pin, one end of which has been designated by reference numeral 18. Two metal plates 19 are secured to the net frame by means of screws or bolts 20. Plates 19 extend inwardly beyond the inner end 21 of the frame and terminate along line 22. Plates 19 are perforated for the reception of the pivot pin and the latter is surrounded by a helical spring 23 one end of which rests against the inner end of the frame as shown in Figure 4 and the other end, which has been designated by reference numeral 24, is anchored to the prong 12. The spring is so arranged as to exert on the net frame a force tending to turn it in a clockwise direction, when viewed as in Figures 2 and 4. To limit the outward movement of the frame, a metal plate 25 has been secured to the ends of the prongs by means of screws or bolts 26. It will be apparent from an inspection of Figure 4, that plates 25 act as a stop which limits the outward movement of the net frame. Spring 23 must be of sufficient strength to hold the frame in extended or operative position and have sufficient flexibility to permit the frame to be rotated through an angle of somewhat more than 180 degrees or from the full line position shown in Figure 2 to the dotted line position. When the net is in folded position, it is latched against the action of the spring by some suitable readily openable latch. In the present embodiment, a strap 27 has been shown as secured to one side of the pocket and is provided with a snap fastener, the female portion of which has been designated by reference numeral 28 and the male portion by reference numeral 29. Any other suitable latching means may be substituted for the one shown as the only requirement is that it must have sufficient strength to hold the net frame in folded position and be of such construction that it can be readily released by one hand. The handle portion may be provided with a loop 30 by means of which the net can be suspended from a hook on the fisherman's belt.

In the present embodiment, a hinge construction has been illustrated which is believed to be highly suitable for this purpose. It is to be understood, however, that any other suitable hinge that performs the same function, in substantially the same way, can be substituted for the specific construction shown.

By providing the pocket with wide hems it can be readily connected with the handle portion so as to simplify the manufacture. After it has been put into place, it may be secured against longitudinal movement by means of tacks 31. After the net has been assembled, there is seldom any need of disassemblying the parts and the pivot pin about which the net turns has therefore been shown as provided with riveted heads at both ends.

Net 17 has been shown more or less diagrammatically as it is merely of a common and well known construction.

Particular attention is called to the fact that with this construction the net frame and the net itself are inserted into a pocket which may be made of canvas, or of any other suitable flexible material, and the net 17 is therefore protected against accidental contact with twigs and branches, thereby making it possible for the fishermen to go through brush and weeds without danger of having the net caught therein.

Although a construction like that shown is believed to be suitable for the purpose, it is evident that the constructions may be modified within the scope of the claims.

In the drawing the net frame 16 has been indicated as of a wooden construction; it is evident, however, that it may be replaced with metal, if this should be found advantageous.

Having described the invention what is claimed as new is:

1. A landing net comprising a handle, a fishing net frame of fixed size pivotally connected with one end thereof for movement in the plane of the frame, through an angle of substantially 180 degrees, means for limiting the pivotal movement in an outward direction, a pocket attached to the handle, the pocket being of such size and so positioned as to receive and enclose substantially all of the fish net and frame when the frame is folded inwardly, and means for latching the frame in folded position.

2. A landing net comprising a handle having one end forked, a pocket having its open end attached to the fork, one side to each fork member, whereby an entrance opening is provided, and a substantially rigid fish net frame pivotally connected with the outer end of the fork for pivotal movement in the plane of the frame, outwardly into extended operative positions and inwardly into a position in which the frame and the net are positioned substantially wholly in the pocket, means for limiting outward movement of the net frame, and means for latching the frame in its inward position after it is positioned in the pocket.

3. A landing net comprising a handle having one end forked, a pocket having its open end attached to the fork, one side to each fork member, whereby an entrance opening is provided, and a substantially rigid fish net frame pivotally connected with the outer ends of the fork for pivotal movement, in the plane of the frame, outwardly into extended operative position and inwardly into a position in which the frame and the net are positioned substantially wholly in the pocket, means comprising a spring for urging the frame into extended position, means for limiting outward movement of the net frame, and means for latching the frame in its inward position after it is positioned in the pocket.

THURMAN A. FINN.